US006970519B2

(12) United States Patent
Rainbolt

(10) Patent No.: US 6,970,519 B2
(45) Date of Patent: Nov. 29, 2005

(54) METHOD AND APPARATUS TO ENHANCE AUDIO QUALITY FOR DIGITIZED VOICE TRANSMITTED OVER A CHANNEL EMPLOYING FREQUENCY DIVERSITY

(75) Inventor: Bradley J. Rainbolt, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/447,933

(22) Filed: May 29, 2003

(65) Prior Publication Data

US 2004/0240575 A1 Dec. 2, 2004

(51) Int. Cl.[7] ............................................. H04L 27/04
(52) U.S. Cl. .................................................... 375/299
(58) Field of Search .......................... 375/132, 240.24, 375/240.27, 267, 299; 714/746, 758

(56) References Cited

U.S. PATENT DOCUMENTS 6,603,752 B1 * 8/2003 Saifuddin et al. ........... 370/335
2001/0028684 A1 * 10/2001 Chung et al. ............... 375/261

FOREIGN PATENT DOCUMENTS

| | | | | |
|---|---|---|---|---|
| EP | 0999669 A1 | | 6/1998 | ............. H04L 1/06 |
| WO | 99/05798 | * | 2/1999 | ............ H04B 7/02 |

* cited by examiner

*Primary Examiner*—Chieh M. Fan
*Assistant Examiner*—Kevin Kim
(74) *Attorney, Agent, or Firm*—Scott M. Garrett

(57) ABSTRACT

Apparatus and corresponding method in a wireless mobile device (10) for classifying each of a plurality of audio bits obtained from a vocoder (104) into one class of a plurality of classes according to a predetermined importance of each audio bit, wherein each of the plurality of classes has an associated error correction process and an associated repeat diversity process. Error correction and repeat diversity are applied to a portion of the plurality of classes based on the associated error correction and repeat diversity processes. The method may be implemented by a processor (10) executing routines stored in a memory (110).

15 Claims, 7 Drawing Sheets

| | NUMBER OF BITS/FRAME IN THE CLASS | FEC RATE | DIVERSITY ORDER |
|---|---|---|---|
| CLASS I | 9 OR 10 | 1/3 | 3rd ORDER |
| CLASS II | 16 | 2/3 | 2nd ORDER WITH INTERLEAVING OVER HOPS |
| CLASS III | 23 OR 24 | NO FEC | 2nd ORDER |

METHOD AND APPARATUS TO ENHANCE AUDIO QUALITY FOR DIGITIZED VOICE TRANSMITTED OVER A CHANNEL EMPLOYING FREQUENCY DIVERSITY

FIELD OF THE INVENTION

The present invention relates to an apparatus that transmits digitized voice and, more particularly, to an apparatus and method to enhance audio quality of the digitized voice when transmitted over a channel in systems employing frequency diversity.

BACKGROUND OF THE INVENTION

Systems for transmitting digitized voice frequently utilize a vocoder for analyzing a short frame of speech and for outputting a voice frame containing a number of audio bits as a response. These audio bits are subsequently used in the receiver to reconstruct a replica of the speech. For typical vocoders, the audio bits in each frame have varying levels of importance to audio quality.

Procedures, often referred to as Voice Channel Procedures (VCPs), are used to apply the available overhead to the audio bits in order to insure that the audio bits arrive at the receiver with optimum or adequate audio quality. For example, a typical VCP might divide the overhead such that more error protection is given or applied to the more important audio bits of each frame than is applied to those audio bits of lesser importance. However, conventional VCPs fail to permit sufficient flexibility in providing error protection to different audio bits.

BRIEF DESCRIPTION OF THE DRAWINGS

The accompanying figures, where like reference numerals refer to identical or functionally similar elements and which together with the detailed description below are incorporated in and form part of the specification, serve to further illustrate various embodiments and to explain various principles and advantages all in accordance with the present invention.

FIG. 13 is a table showing an exemplary manner for classifying each of the audio bits and an associated forward error correction and diversity order for each class.

DETAILED DESCRIPTION OF THE PREFERRED EMBODIMENTS

Figure 1:
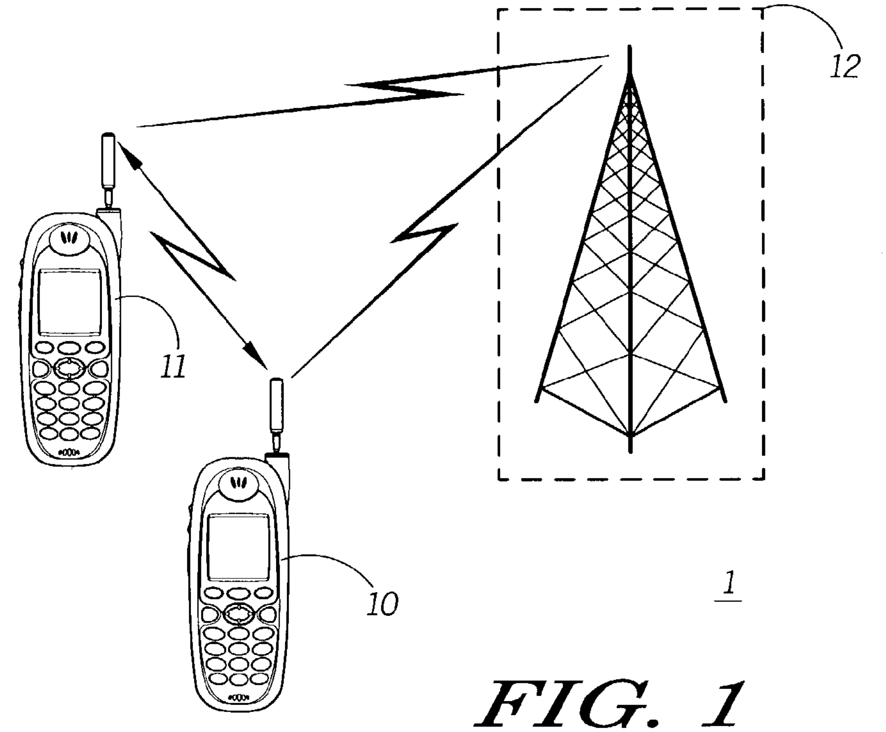
FIG. 1 depicts, in a simplified and representative form, an exemplary system in which the present invention is implemented.

In overview, the present disclosure concerns wireless mobile devices that transmit and receive digitized voice. The present disclosure further concerns a Voice Channel Procedure (VCP) that is utilized by a wireless mobile device to properly apply error correction and repeat diversity processes that can enhance quality of the audio as received at the receiver. Note that wireless mobile device may be used interchangeably herein with wireless subscriber device or unit and each of these terms denotes a device ordinarily associated with a user and typically a wireless mobile device that may be used with a public network in accordance with a service agreement or within a private network.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

As further discussed below various inventive principles and combinations thereof are advantageously employed to classify each audio bit of a plurality of audio bits obtained from a vocoder into a plurality of classes, each class indicative of different relative significance or importance to received audio quality, to apply an associated error correction process and a repeat diversity process to each of the plurality of classes, where one or both of the associated error correction process and repeat diversity process is unique to each class, and to send or transmit the classes with error correction over a plurality of channels, preferably frequency hops in accordance with the repeat diversity process, thus enhancing reception quality of the received audio.

Referring now to FIG. 1, the Voice Channel Procedure (VCP) is preferably implemented within a communications system (hereafter "system") depicted generally and simplistically in FIG. 1. It will be appreciated that various systems, such as integrated digital enhanced networks and various others that employ vocoders in their equipment can also benefit from the concepts and principles discussed herein. The system 1 generally includes or supports a plurality of wireless mobile devices with wireless mobile device 10, 11 depicted. These devices 10, 11 can support a wireless communication channel with a base site 12. The base site 12 provides the wireless mobile device 10 with communication with other subscriber units or wired communication devices, such as plain old telephones as is known. Furthermore, the wireless communication devices 10, 11 can support a wireless communication link from one device 10 to the other device 11. The VCP can more particularly be implemented for this communication link between devices. This capability of one device linking directly to another device in a direct device to device connection may be referred to as talk around for these communication devices. In the preferred form this feature uses a frequency hopping protocol according to the ISM regulations for the 902–928 frequency band that can allow the advantages of frequency diversity to be realized. In such systems, in order to realize the advantages of frequency diversity, the transmitted signal or symbol is repeated on more than one carrier frequency and a receiver makes a decision based on statistics from each of those frequency bands. The statistics will be affected by fading processes that are decorrelated when the spacing between the carrier frequencies is sufficiently large. The wireless mobile device 10, identical to or similar to device 11, will be discussed more fully below.

Figure 2:
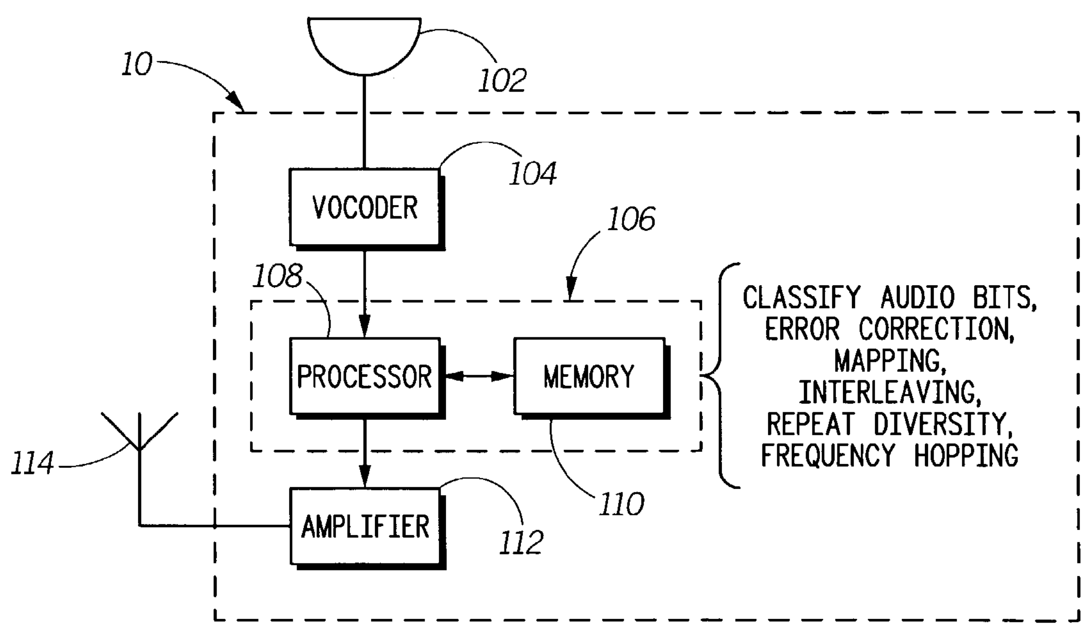
FIG. 2 illustrates a block diagram of the wireless device 10 of FIG. 1.

Referring to FIG. 2, the wireless mobile device 10 includes, among other components, a microphone 102, a vocoder 104, a controller 106, an amplifier 112 or radio frequency power amplifier and an antenna 114 all inter coupled as depicted. The vocoder 104 is for encoding analog traffic such as voice or speech as received from the microphone 102 and generating resultant voice frames. Each of the voice frames is composed of a predetermined number or a plurality of audio bits. The vocoder 104 is preferably an Advanced Multi-Band Excitation vocoder that produces a voice frame of 49 audio bits in each 22.5 ms time window.

The controller 106 is a general-purpose processor that controls the wireless communication device and provides various signal processing functions and, preferably, includes a voice and data processor 108 and an associated memory 110. The voice and data processor 108 is, preferably, a known processor based element with functionality that will depend on the specifics of the air or wireless interface with the radio access network or base site 12 and other communication devices, as well as various network protocols for voice and data traffic.

The processor 108 will operate to encode voice traffic received from the vocoder 104 according to routines stored in the memory 110 to provide signals suitable for transmission. The processor 108 may include one or more microprocessors, digital signal processors, and other integrated circuits depending on the responsibilities of the controller with respect to air interface signal processing duties that are not here relevant and the specifics of the VCP as implemented. However, the processor 108 in one embodiment is a processor based application specific integrated circuit (ASIC). The controller 106 also includes the memory 110 that may be a combination of known RAM, ROM, EEPROM or magnetic memory.

The memory 110 is used to store among various other items or programs etc., a classify audio bits routine for classifying each audio bit of the plurality of audio bits into one class of a plurality of classes according to a predetermined importance of each audio bit to audio quality, wherein each of the plurality of classes has an associated error correction process, such as an error correction code, and an associated repeat diversity process or order, an error correction routine for applying error correction to each of the plurality of classes based on the associated error correction process or code, a mapping routine for mapping the classes of audio bits, after applying error correction, into symbols for transmission, an interleaving routine for interleaving a number of the symbols in predetermined patterns and for applying a block interleaver to the symbols, a repeat diversity routine for applying a repeat diversity to each of the plurality of classes based on the associated repeat diversity process or order and a frequency hopping routine for establishing a pattern of frequencies used for transmitting the symbols of the plurality of classes over a plurality of frequency hops.

The amplifier 112 is for amplifying a carrier signal that has been modulated by the symbols prior to transmission as is known. The antenna 114 operates to transmit or radiate the carrier signal modulated with the symbols over the plurality of frequency hops as is also known.

Figure 3:
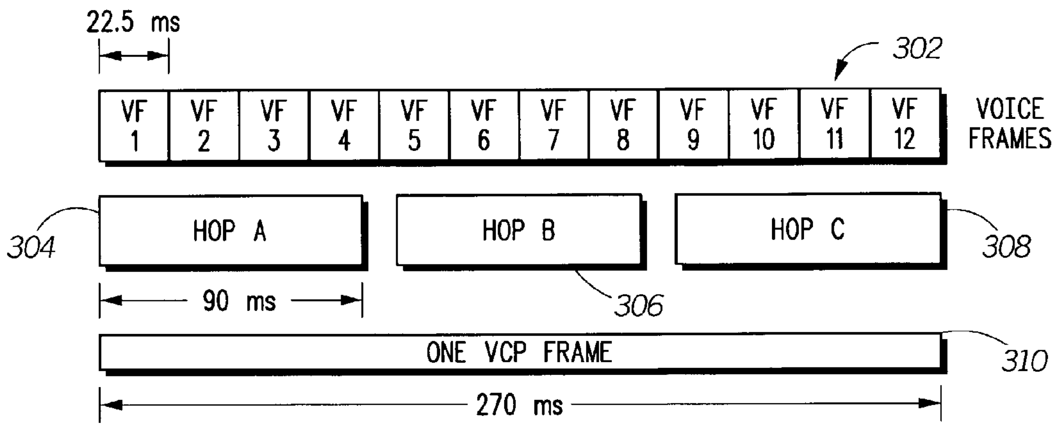
FIG. 3 illustrates the different voice frames and slots in an exemplary Voice Channel Procedure frame.

Referring to FIG. 3, an exemplary voice frame 302 generated by the vocoder 104 will be discussed more fully. As mentioned earlier, the vocoder 104 is preferably an Advanced Multi-Band Excitation vocoder. The vocoder 104 will collect 270 ms of speech from the microphone 102 and process it into twelve voice frames 302. Each of the twelve voice frames 302 will be composed of 49 audio bits and be 22.5 milliseconds (ms) in duration. As will be more fully discussed below, the controller 106 will process the 12 voice frames to produce a single VCP frame 310. The VCP frame 310 will be transmitted over a plurality of frequency hops. For the preferred form supporting a dispatch or direct connection mode between two wireless communication devices, the VCP frame 310 will be transmitted on three frequency hops (depicted by 304, 306, 308) as shown in FIG. 3 with each hop having a time duration of 90 ms and comprising 256 8-FSK symbols (each symbol encodes 3 bits).

Figure 4:
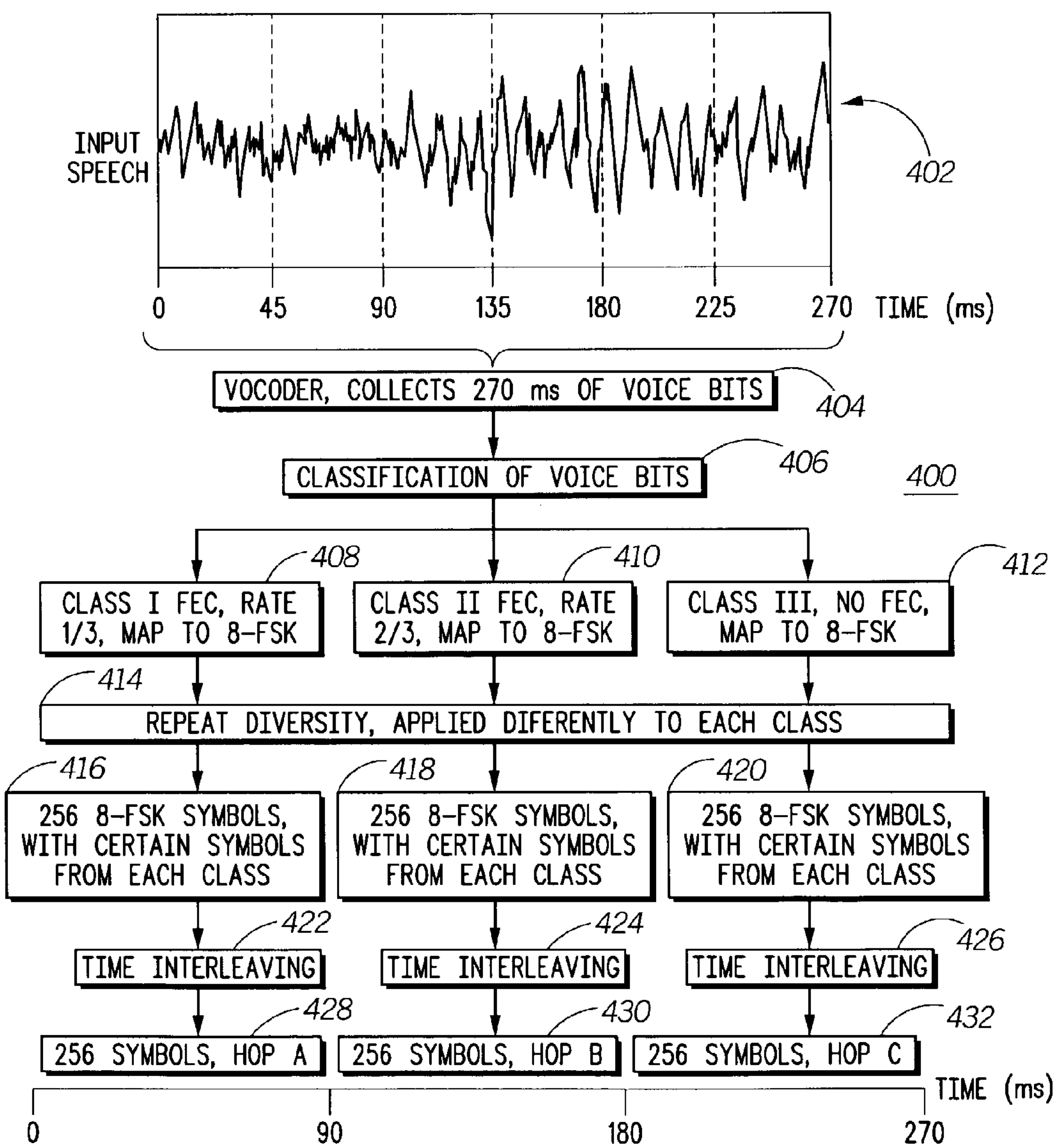
FIG. 4 illustrates a flow chart of the Voice Channel Procedure for enhancing quality of received audio.

Referring to FIG. 4, the VCP methodology 400 for enhancing audio quality will be discussed while also referring to the reference numerals shown in FIGS. 2–3. The VCP begins at 404 where the vocoder collects 270 ms of audio (such as speech depicted by 402) and generates or encodes the speech into the 12 voice frames 302. At 406, the processor 108, operating in accordance with the routine for classifying audio bits stored in the memory 110, obtains the plurality of voice frames 302 from the vocoder 104 and classifies each of the 49 audio bits in each of the frames 302 into one class of a plurality of classes according to a predetermined importance of each audio bit. Each of or at least a portion or predetermined number of the plurality of classes has an associated error correction process or code that preferably varies with the class and an associated repeat diversity process or order that again preferably varies with the class.

The predetermined importance of each audio bit is determined by subjective listening tests. More specifically, there are usually a small group of audio bits in each voice frame that are extremely important and accordingly result in severely degraded audio quality if they are received in error. There also will be other audio bits that will result in minor audio quality degradation if they are received in error. The subjective listening tests will determine the specific bit sequential value (bit1, bit2, . . . ) of the audio bits that are the most important for obtaining high audio quality. For example, a subjective listening test performed by the inventors for the 49 bits in the voice frames produced by the Advanced Multi-Band Excitation vocoder demonstrated that bit sequential values 1, 2, 3, 4, 7, 8, 9, 10, 11 and 28 have highest importance, bit sequential values 5, 6, 10, 12–22, 27, 29 and 37 have intermediate importance and that bit sequential values 23–26, 30–36 and 38–49 have the lowest importance. It should be noted that the results of the subjective listening tests will be different for different vocoders and will vary from one listener to the other because they are subjective.

Figure 5:
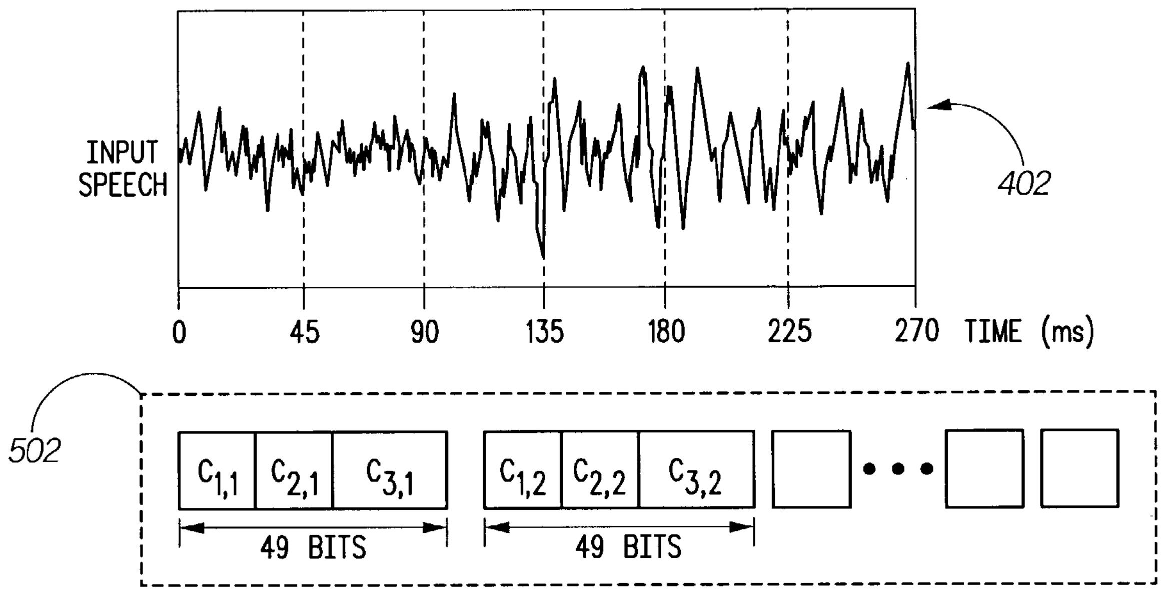
FIG. 5 illustrates the classification of each audio bit within a voice frame.

Referring to FIGS. 5 and 13, one embodiment of the method by which the audio bits in the voice frames are classified will be further discussed. The audio bits of each of the voice frames are preferably classified in three classes $C_{1,1}$, $C_{2,1}$, and $C_{3,1}$ for the first frame as shown within the voice frames 502. This classification amounts to parsing each 49 bit voice frame to select the audio bits that are members of each class based on the above discussed subjective determination of which bits are what level of importance to audio quality. Each of the three classes will include a predetermined number of the plurality of audio bits in each voice frame and have an associated forward error correction and repeat diversity process. A first predetermined number of the plurality of audio bits in each voice frame are classified into class I (the highest importance class), a second predetermined number of the plurality of audio bits are classified into class II (an intermediate importance class) and a remaining number of the plurality of audio bits are classified into class III (a lowest importance class). An exemplary manner for classifying each of the plurality of audio bits is shown in FIG. 13. During half of the voice frames the first predetermined number will be nine class I audio bits and the third predetermined number will be 24 class III audio bits, and in the other half of the frames the first predetermined number may be ten class I bits and the third predetermined number may be 23 class III bits. The second predetermined number will always be 16 class II bits in each frame. As shown in FIG. 5, the 49 audio bits comprising the jth voice frame, (j=1, 2 . . . , 12) are divided into the vectors $C_{1,j}$, $C_{2,j}$, and $C_{3,j}$ for the class I, II, and III audio bits, respectively.

Returning to FIG. 4, after each of the 49 audio bits of each voice frame are classified into one of the three classes by divided them into the vectors $C_{1,j}$, $C_{2,j}$, and $C_{3,j}$ for the class I, II, and III audio bits, respectively, at 408–412, the processor 108 operating in accordance with the error correction routine and mapping routine stored in the memory 112 applies encoding or forward error correction coding to each of the three classes according to its associated error correction process or code and maps the resultant bits including forward error correction to 8-FSK symbols (3 bits for each symbol).

Figure 6:
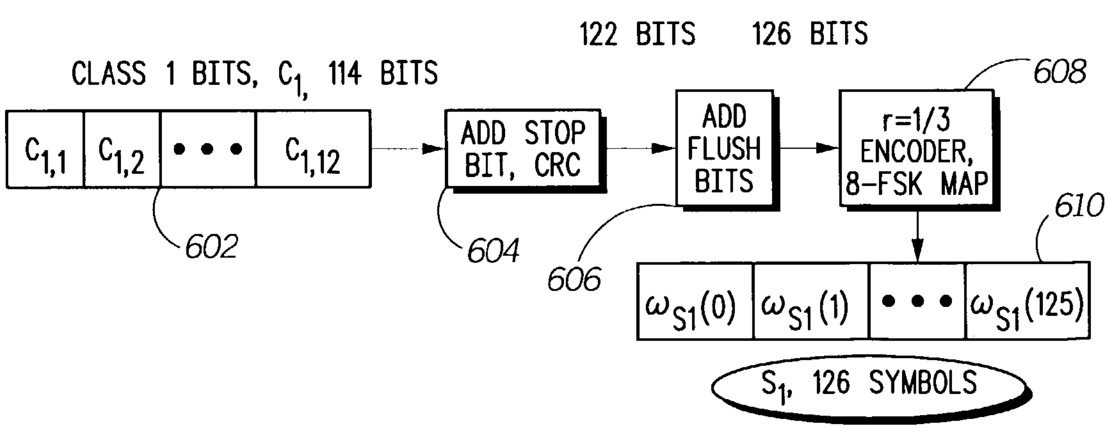
FIG. 6 illustrates a flow chart of the encoding, error correction and mapping processes performed on the first class of audio bits.

Referring to FIG. 6, the encoding or forward error correction coding and mapping applied at 408 will be more specifically discussed. At 602, the class I audio bits from each of the 12 voice frames $C_{1,1}$, $C_{1,2}$, . . . $C_{1,12}$, are collected into a vector of 114 audio bits. At 604, the vector of 114 audio bits is appended with a stop bit that serves as a control bit and is also appended with a 7-bit Cyclic Redundancy Check (CRC) as is known. At 606, the vector of 122 bits is then appended with 4 flush bits of zeros. At 608, the vector is encoded with a rate 1/3 convolutional encoder to provide a first plurality of convolutionally encoded audio bits. The class I audio bits are encoded with a error correction rate (1/3) that applies the highest error correction because they are the highest importance class of the plurality of classes.

At 608, the first plurality of convolutionally encoded audio bits are also mapped into a first group of 126 8-FSK symbols 610 or modulation symbols. The first group is represented generally by the vector $S_1$. As will be discussed below, this first group $S_1$ of 8-FSK symbols are generated or repeated for each of the three frequency hops, respectively.

Figure 7:
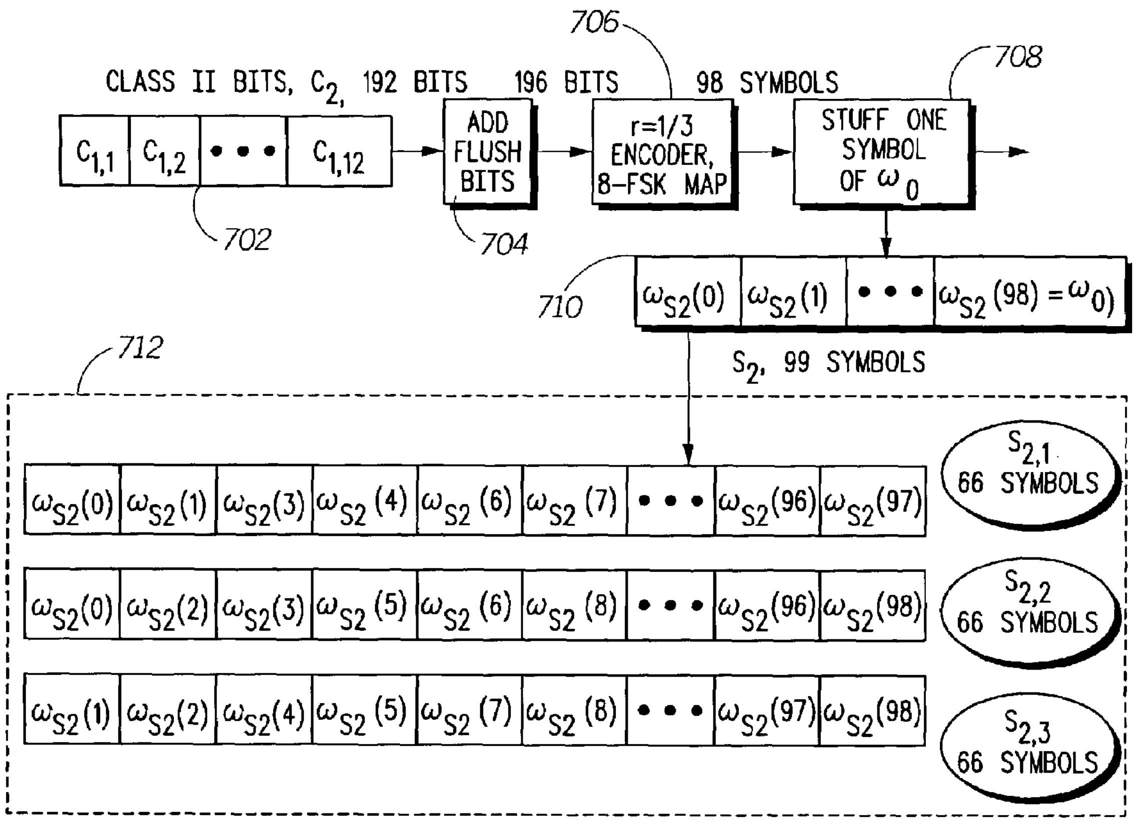
FIG. 7 illustrates a flow chart of the encoding, error correction, mapping and interleaving processes performed on the second class of audio bits.

Referring to FIG. 7, the encoding, forward error correction coding and mapping applied at 410 for class II audio bits will be discussed in more detail. At 702, the class II audio bits from each of the 12 voice frames $C_{2,1}$, $C_{2,2}$, . . . $C_{2,12}$, are collected into a vector of 192 audio bits. At 704, the vector of 192 audio bits is appended with 4 flush bits. At 706, the vector of 196 bits is then encoded with a rate 2/3 encoder to provide a second plurality of convolutionally encoded audio bits. The second plurality of convolutionally encoded audio bits, comprising 294 bits is mapped to a second group of 98 8-FSK symbols. At, 708, the second group is stuffed with one additional symbol. The second group of 99 8-FSK symbols is represented generally by the vector $S_2$ and is depicted at 710. At 712, the second group of 99 8-FSK symbols is interleaved across three sub-groups in a predetermined pattern for providing three sub-groups (or hops) of symbols represented generally by the vectors $S_{2,1}$, $S_{2,2}$ and $S_{2,3}$. Each of the three sub-groups will have 66 8-FSK symbols.

Figure 8:
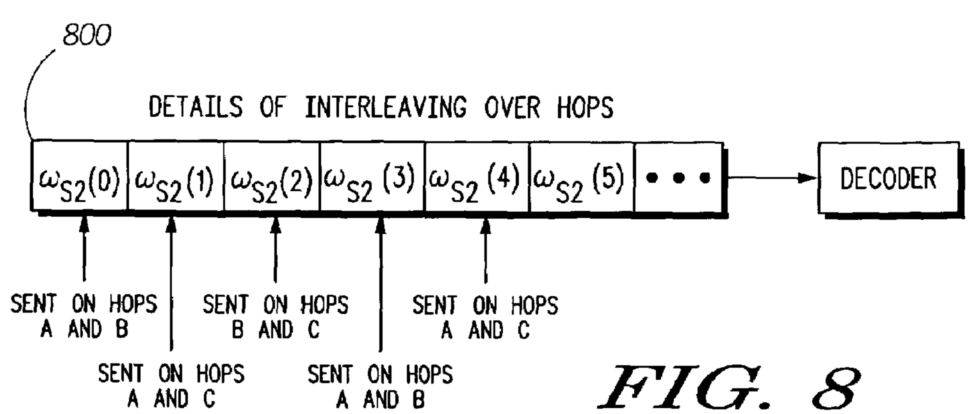
FIG. 8 further illustrates the interleaving process performed on the second class of audio bits.

The predetermined pattern in which the second group of 99 8-FSK symbols is interleaved is shown in FIG. 8. The predetermined pattern is defined over a window of three consecutive symbols (e.g., $\omega_{S2}(0)$, $\omega_{S2}(1)$, $\omega_{S2}(2)$) in which the first symbol is sent in the first and second sub-groups (vectors $S_{2,1}$, $S_{2,2}$) and first and second frequencies or frequency hops, the second symbol is sent in the first and third sub-groups (vectors $S_{2,1}$, $S_{2,3}$) and first and third frequency hops, and the third symbol is sent in the second and third sub-groups (vectors $S_{2,2}$, $S_{2,3}$) and thus the second and third frequency hops. When the corresponding statistics are input to the Viterbi decoder at the receiver, this interleaving across the three sub-groups allows for additional diversity, which will be illustrated later.

Figure 9:
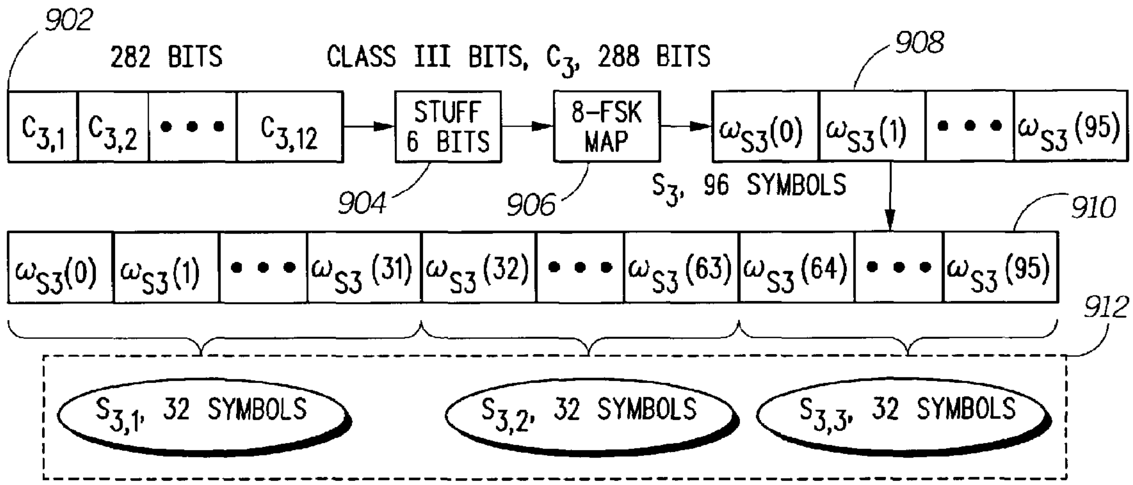
FIG. 9 illustrates the mapping process performed on the third class of audio bits.

Referring to FIG. 9, the encoding, forward error correction and mapping applied at 412 will be more particularly discussed. At 902, the class III (or remaining) audio bits from each of the 12 voice frames $C_{3,1}$, $C_{3,2}$, . . . , $C_{3,12}$, are collected into a vector of 282 audio bits. At 904, the vector of 282 audio bits is stuffed with six additional bits. Because the associated error correction process of the class III bits is null in this particular embodiment, no forward error correction is applied. At 906, the vector of 288 bits is mapped into a third group of 96 8-FSK modulated symbols. The third group of 96 8-FSK symbols is represented generally by the vector $S_3$ and is depicted at 910. At 912, the third group of 96 8-FSK symbols is separated into three equal sub-groups represented generally by the vectors $S_{3,1}$, $S_{3,2}$ and $S_{3,3}$. Each of the three equal sub-groups will have 32 8-FSK symbols.

Figure 10:
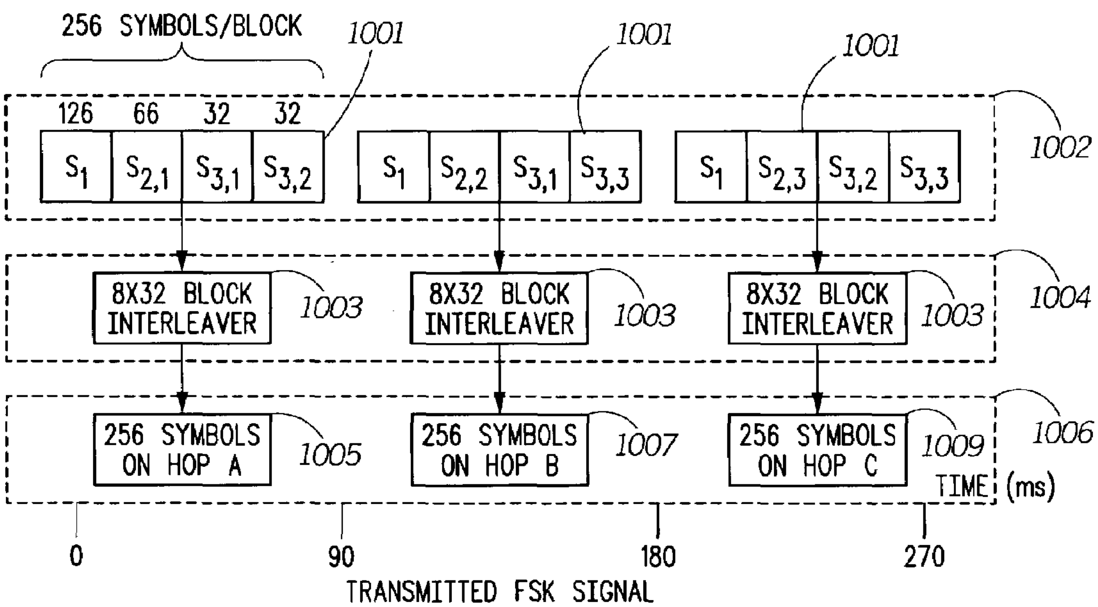
FIG. 10 illustrates block interleaving process performed on all of the classes of audio bits.

Returning to FIG. 4, at 414–420 the processor 108, operating in accordance with the repeat diversity routine stored in the memory 110, applies a specific repeat diversity to each class according to its associated repeat diversity process for assembling three blocks 1001 that will be transmitted one each over each of three frequency hops, respectively. More specifically, as shown in FIG. 10, at 1002 each of the three blocks 1001 is assembled to include the first group $S_1$, one of the three sub-groups of the second group and two of the three sub-groups of the third group. In other words, the class I symbols are repeated in all three frequency hops 1001, the class II symbols are repeated twice and interleaved across the three blocks (as shown in FIG. 7), and the class III symbols are each simply repeated twice in two of the three blocks in another predetermined pattern. Each block 1001 will have 256 8-FSK symbols.

Returning to FIG. 4, at 422–426 each of the blocks is time interleaved by, for example, utilizing an 8×32 block interleaver 1003 as shown at 1004 in FIG. 10. Finally, at 428–432 each of the three blocks 1001 as interleaved is respectively used to modulate a carrier and transmitted on a corresponding one of three frequency hops. Note that interleaving across the frequency hops in the class II symbols that was performed at 712 is different from, transparent to, and in addition to this 8×32 block interleaving.

Figure 11:
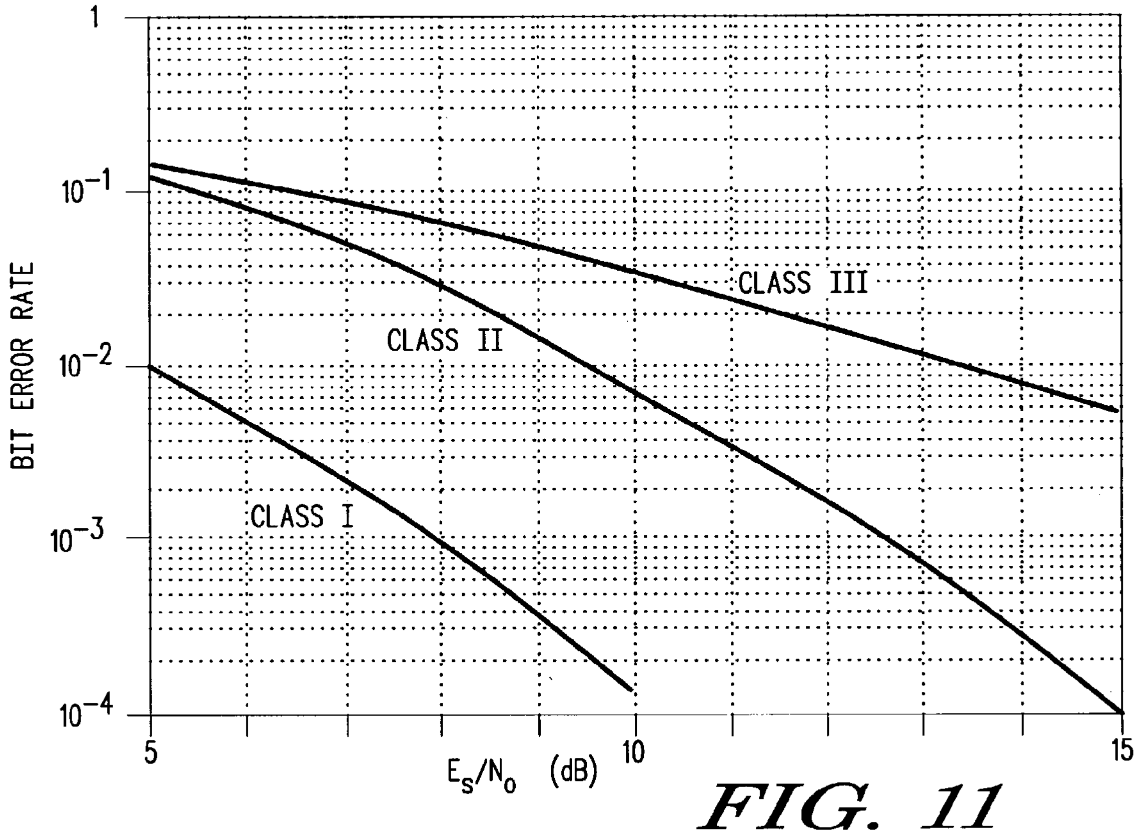
FIG. 11 illustrates the performance of the Voice Channel Procedure for the three classes on a Rayleigh fading channel at 3 mph.
Figure 12:
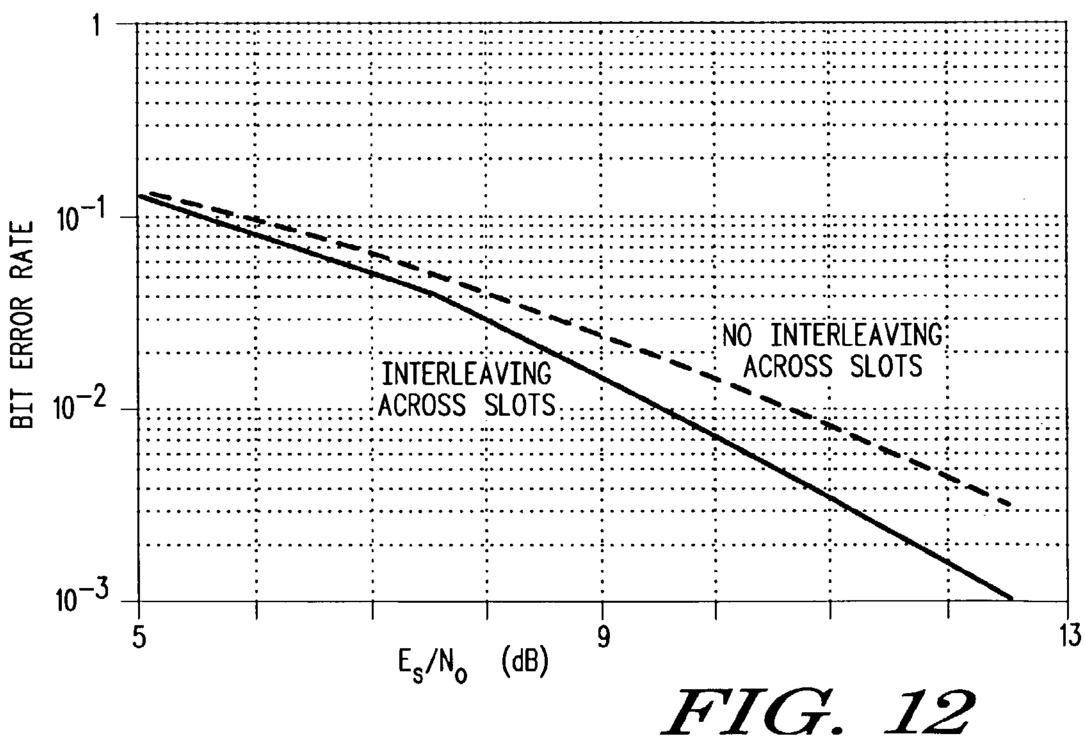
FIG. 12 illustrates the improvement of performance achieved by interleaving the class II symbols.

Referring to FIGS. 11–12, performance and advantages of the VCP in accordance with the present invention will be discussed. The performance of the VCP was simulated in an environment that included a Rayleigh fading channel and mobile speed of 3 mph. The fading on each of the frequency hops was taken as independent. The receiver used a bank of matched-filters, one for each of the 8 frequencies with one frequency of the eight corresponding to each of the 8-FSK symbols, to generate a set of 8 complex statistics during each symbol interval. The sets of statistics (three sets for class I symbols and two sets for otherwise) corresponding to a symbol that was repeated on different hops were square-law combined. The combined statistics of those symbols which were coded (class I and class II) were then input to a Viterbi decoder, which used square law combining of the branch metrics to form the path metrics. The combined statistics of the uncoded class III symbols were demodulated directly by choosing the symbol as the one for which the combined statistic was maximum.

The bit error rate results in the corresponding $E_s/N_0$ (in dB) values are shown in FIG. 11 for each of the three classes. At a bit error rate of 0.01, the class I bits performed approximately 4.5 dB better than the class II bits. Also, at the same bit error rate, the class II bits performed approximately 3.5 dB better than the class III bits. Thus, the VCP design in which a combination of different amounts of repeat diversity and different amounts of FEC are provided for each of the classes results in a substantially different amount of error protection for each of the different classes.

The above simulation was performed a second time without interleaving the class II symbols. However, in the second simulation, the class II symbols were simply repeated on two of the three frequency hops and not interleaved across the frequency hops. The bit error rate results and the corresponding $E_s/N_0$ (in dB) values are shown in FIG. 12 for class II symbols that were interleaved (at 710) and class II symbols that were not interleaved. At $E_s/N_0$ values of 9 dB and higher, the interleaving across hops achieved a gain of at least 1 dB.

Therefore, interleaving the class II symbols (as done at 710) achieves the superior result of a gain of at least 1 dB at $E_s/N_0$ values of 9 dB and higher. Further, this VCP task may be implemented with a negligible number of additional lines of code and DSP cycles.

Therefore, the present invention provides a novel voice channel procedure (method) for enhancing quality of received audio. The VCP includes classifying each audio bit of the plurality of audio bits received from a vocoder into one class of a plurality of classes according to a predetermined importance of each audio bit, wherein each of the plurality of classes has an associated error correction process or code and an associated repeat diversity process. Each of the audio bits is classified according to its bit sequential value. More specifically, a first predetermined number of the plurality of audio bits may be classified into a highest importance class, a second predetermined number of the plurality of audio bits is classified into an intermediate importance class, and a remaining number of the plurality of audio bits are classified into a lowest importance class.

Error correction coding and repeat diversity is applied to each of a predetermined number of the plurality of classes based on the associated error correction process or code and the associated repeat diversity process. A highest error correction is applied to a highest importance class of the plurality of classes. The error correction coding may comprise performing a predetermined rate convolutional encoding on the first predetermined number of the plurality of audio bits to provide first convolutionally encoded bits, performing another predetermined rate convolutional encoding on the second predetermined number of the plurality of audio bits to provide second convolutionally encoded bits, wherein the second predetermined rate is higher thus providing less forward error protection than the first predetermined rate. However, the error correction coding and repeat diversity applied generally includes convolutionally encoding a predetermined number of the plurality of classes based on its associated error correction process or code to provide a plurality of convolutionally encoded audio bits in the predetermined number of the plurality of classes and repeating convolutionally encoded audio bits or corresponding symbols in a highest importance class of the predetermined number of the plurality of classes across substantially all of a plurality of frequency hops and interleaving convolutionally encoded audio bits or corresponding symbols in an intermediate importance class of the predetermined number of the plurality of classes across a predetermined number of the plurality of frequency hops.

The first convolutional encoded bits are mapped to a first group of symbols and the second convolutional encoded bits are mapped to a second group of symbols. The second group of symbols is also interleaved across three sub-groups in a predetermined pattern for providing three sub-groups of symbols.

A remaining number of the plurality of audio bits is mapped into a third group of symbols. The third group of symbols is separated into another three sub-groups.

A plurality of blocks are assembled one block for each of a plurality of frequency hops. Each of the plurality of blocks is comprised of the first group, one of the three sub-groups of the second group and two of the three sub-groups of the third group. Each of the plurality of blocks is interleaved by, for example, a block interleaver and transmitted over or during one of a plurality of frequency hops, respectively.

The VCP for enhancing reception quality is preferably implemented within a transmitter such as the wireless device 10, 11. The transmitter includes an audio bit classifier for classifying each audio bit of a plurality of audio bits obtained from a vocoder into one class of a plurality of classes according to a predetermined importance of each audio bit, wherein each or at least a portion of the plurality of classes has an associated error correction process or code and repeat diversity process and an encoding device for applying repeat diversity to each of the plurality of classes based on the repeat diversity process and for applying error correction coding to a predetermined number of the plurality of classes based on the associated error correction process or code. The encoding device is further for applying a predetermined rate convolutional encoding on each of the predetermined number of classes based on the associated error correction process or code to provide a plurality of convolutionally encoded bits, mapping each of the plurality of convolutionally encoded bits and a remaining number of audio bits of a remaining number of classes into symbols that are used to modulate a carrier signal, interleaving symbols associated with an intermediate importance class of the plurality of classes across a plurality of frequency hops in a predetermined pattern, repeating symbols associated with a highest importance class across the plurality of frequency hops, repeating symbols associated with a lowest importance class across the plurality of frequency hops in another predetermined pattern and repeating symbols associated with the intermediate importance class across a number of the plurality of frequency hops.

The encoding device and the audio bit classifier are represented in FIG. 2 by the controller 106. More specifically, the encoding device is preferably implemented by the processor 108 executing the error correction, mapping, interleaving, repeat diversity and frequency hopping routines stored in the memory 110. The audio classifier is preferably implemented by the processor 108 executing the classify audio bits routine that is also stored in the memory 110. However, a separate processor or ASIC may be provided to implement the mapping.

Although the exemplary implementation of the VCP discussed above included three classes and three frequency hops, the VCP is not limited to such a number of classes or frequency hops. Rather, the VCP generally includes a plurality of classes of varying importance and a plurality of frequency hops. Further, the error correction applied to the classes is not limited to the forward error correction discussed above and may be applied by, for example, block coding, turbo coding, or concatenated coding. Also, the VCP is not limited to mapping the audio bits to 8-FSK symbols. The audio bits can generally be mapped to $2^R$-FSK symbols in which R is an integer greater than zero. The audio bits may also be mapped by other modulation types, such as ASK, CPM, PSK, digital AM, or QAM as well.

This disclosure is intended to explain how to fashion and use various embodiment in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for enhancing quality of received audio, the method comprising:

obtaining a plurality of audio bits from a vocoder;

classifying each audio bit of the plurality of audio bits into one class of a plurality of classes according to a predetermined importance of each audio bit to the quality of received audio, wherein each of the plurality of classes has an associated error correction process and an associated repeat diversity process, the associated repeat diversity process differing between a first and a second class;

applying error correction to each of a predetermined number of the plurality of classes based on its respective associated error correction process; and applying repeat diversity to each of the predetermined number of the plurality of classes based on its respective associated repeat diversity process;

wherein applying the error correction and the repeat diversity to the each of the predetermined number of the plurality of classes based on the associated error correction process and the associated repeat diversity process further comprises:

convolutionally encoding the each of the predetermined number of the plurality of classes based on its respective associated error correction process to provide a plurality of convolutionally encoded audio bits corresponding to the each of the predetermined number of the plurality of classes;

repeating first symbols corresponding to the convolutionally encoded audio bits in a highest importance class of the each of the predetermined number of the plurality of classes across substantially all of a plurality of frequency hops; and interleaving second symbols corresponding to the convolutionally encoded audio bits in an intermediate importance class of the each of the predetermined number of the plurality of classes across a predetermined number of the plurality of frequency hops.

2. The method of claim 1, wherein the applying the error correction further comprises applying a higher error correction to a higher importance class of the plurality of classes.

3. The method of claim 1, wherein the classifying each audio bit of the plurality of audio bits further comprises classifying each audio bit according to its bit sequential value.

4. The method of claim 1, wherein the classifying each audio bit of the plurality of audio bits further comprises:

classifying a first predetermined number of the plurality of audio bits into a highest importance class;

classifying a second predetermined number of the plurality of audio bits into an intermediate importance class; and classifying a remaining number of the plurality of audio bits into a lowest importance class.

5. The method of claim 4, wherein the applying the error correction further comprises applying a predetermined rate convolutional encoding on the first predetermined number of the plurality of audio bits to provide first convolutionally encoded bits.

6. The method of claim 5, wherein the applying the error correction further comprises applying another predetermined rate convolutional encoding on the second predetermined number of the plurality of audio bits to provide second convolutionally encoded bits, wherein the another second predetermined rate is higher than the first predetermined rate.

7. The method of claim 6, further comprising:

mapping the first convolutionally encoded bits to a first group of symbols;

mapping the second convolutionally encoded bits to a second group of symbols;

interleaving the second group of symbols across three sub-groups in a predetermined pattern for providing three sub-groups of symbols;

mapping the remaining number of the plurality of audio bits into a third group of symbols; and separating the third group of symbols into another three sub-groups.

8. The method of claim 7, further comprising:

assembling a plurality of blocks, each of the plurality of blocks comprised of the first group, one of the three sub-groups of the second group and two of the another three sub-groups of the third group.

9. The method of claim 8, further comprising:

interleaving each of the plurality of blocks; and transmitting each of the plurality of blocks as interleaved during one or more of a plurality of frequency hops, respectively.

10. The method of claim 1, wherein the obtaining of the plurality of audio bits from the vocoder further comprises obtaining a plurality of voice frames from the vocoder, each of the plurality of voice frames comprised of a predetermined number of the plurality of audio bits.

11. A transmitter for enhancing reception quality of audio, the transmitter comprising:

an audio bit classifier for classifying each audio bit of a plurality of audio bits obtained from a vocoder into one class of a plurality of classes according to a predetermined importance to the reception quality of audio, wherein each of the plurality of classes has an associated error correction process and associated repeat diversity process, the repeat diversity process differing between a first and second class; and an encoding device for applying repeat diversity to each of the plurality of classes based on the associated repeat diversity process and for applying error correction to a predetermined number of the plurality of classes based on the associated error correction process, and further for applying a predetermined rate convolutional encoding to each of the predetermined number of classes based on the associated error correction process to provide a plurality of convolutionally encoded bits, and wherein the encoding device performs:

mapping each of the plurality of convolutionally encoded bits and a remaining number of audio bits of a remaining number of classes into symbols;

interleaving symbols corresponding to an intermediate importance class of the plurality of classes across a plurality of frequency hops in a predetermined pattern; and repeating symbols corresponding to one of a lowest, intermediate or highest importance class across the plurality of frequency hops.

12. A processing device arranged to enhance reception quality of audio, the processing device when installed and executing on a transmitter resulting in the transmitter:

classifying each audio bit of a plurality of audio bits obtained from a vocoder into one class of a plurality of classes according to a predetermined importance to the reception quality of audio, wherein each of the plurality of classes has an associated error correction process and repeat diversity process;

applying repeat diversity to each of the plurality of classes based on the repeat diversity process and applying error correction coding to a predetermined number of the plurality of classes based on the associated error correction process to provide a plurality of convolutionally encoded audio bits;

mapping each of the plurality of convolutionally encoded audio bits and a remaining number of the plurality of audio bits into a plurality of symbols;

interleaving symbols corresponding to an intermediate importance class of the plurality of classes across a plurality of blocks in a predetermined pattern; and repeating symbols corresponding to a highest importance class across the plurality of blocks.

13. The processing device of claim 12, further comprising repeating symbols corresponding to a lowest importance class across the plurality of blocks in another predetermined pattern.

14. The processing device of claim 12, further comprising repeating the symbols corresponding to the intermediate importance class across the plurality of blocks in the predetermined pattern.

15. The processing device of claim 12, further comprising:

interleaving symbols in each of the plurality of blocks; and transmitting symbols in each of the plurality of blocks as interleaved on one or more of a plurality of frequency hops, respectively.

* * * * *